United States Patent [19]
Jacobs

[11] 3,849,586
[45] Nov. 19, 1974

[54] ELECTRIC ARC FURNACES AND REFRACTORY SHAPES THEREFOR

[75] Inventor: Louis John Jacobs, Chicago, Ill.

[73] Assignee: Combustion Engineering, Inc., Windsor, Conn.

[22] Filed: Feb. 20, 1974

[21] Appl. No.: 444,193

[52] U.S. Cl. ............................ 13/32, 13/35, 52/606
[51] Int. Cl. ............................................. F27d 1/04
[58] Field of Search ............ 13/1, 9, 32, 35; 52/605, 52/606

[56] References Cited
UNITED STATES PATENTS

| | | | |
|---|---|---|---|
| 1,868,329 | 7/1932 | Lulofs | 13/32 |
| 1,992,465 | 2/1935 | Blagg | 13/32 X |
| 2,222,004 | 11/1940 | Smith | 13/32 X |
| 2,692,131 | 10/1954 | Hasche | 52/605 X |

Primary Examiner—R. N. Envall, Jr.
Attorney, Agent, or Firm—Richard H. Berneike

[57] ABSTRACT

Specially shaped refractory bricks which form openings or channels through a wall formed therefrom are used in the sidewalls of electric arc furnaces adjacent the roof for the purpose of admitting cool room temperature air to sweep across and cool the roof. Means are provided for selectively opening and closing the channels whereby roof temperatures may be controlled in localized areas as needed. The channels are formed by abutting the side faces of the bricks which each have grooves therein. The grooves and thus the channels are tapered to permit easy removal of obstructions.

3 Claims, 4 Drawing Figures

ELECTRIC ARC FURNACES AND REFRACTORY SHAPES THEREFOR

BACKGROUND OF THE INVENTION

Many metals, ores and minerals are melted and refined in electric arc furnaces. Originally the electric furnaces were used almost exclusively for the production of quality alloy steels. However, there has been an increase in the production of open hearth quality steel in electric furnaces giving the impetus to the development of larger furnaces. The problems relating to refractories in these furnaces are becoming increasingly important. The increased rates at which the process is carried out are imposing great strains on the furnace linings, particularly the sidewalls and the roof. The larger transformers that are used are causing very large and rapid variations in the hot face temperature of the refractories.

Acid roofs of silica brick are still widely used on electric furnaces although the use of high alumina (70–85 percent alumina) roofs are becoming more popular especially on the larger furnaces. Although the alumina brick is more expensive, its high refractoriness and additional life compensate for the increased cost.

The mechanism of failure of silica brick is mainly by the formation of liquid silicates while the high alumina refractory tends to fail by absorbing iron oxide and other materials from the furnace atmosphere. This leads to softening, sintering and spalling of the refractory. In all cases, the high temperature of the refractory hot face is a major contributing factor to refractory failure. Also, the oxygen lancing, which is becoming widely used for carbon removal and to increase the speed of the process, increases the amount of fume evolved in the furnace. These fumes are very hot, often very small, particles consisting mainly of iron oxide which are absorbed into the alumina refractory resulting in the failure mentioned above. The temperature of the waste gases during the oxygen blowing period has increased very considerably and this has increased iron oxide absorption and added to the incidence of premature roof failure. The attack on the roof often tends to be localized rather than uniform due to significant temperature variations.

SUMMARY OF THE INVENTION

The basic concept of the present invention is to keep the temperatures of the roof below that where softening or sintering can occur and keep the roof surfaces as clean as possible. This is accomplished by providing a row of specially designed refractory brick at the top of the sidewall of the furnace which form openings permitting a flow of air into the furnace to sweep across the hot face of the roof. The invention further involves means for controlling the flow of air into these openings.

DESCRIPTION OF THE PREFERRED EMBODIMENT

Figure 1:
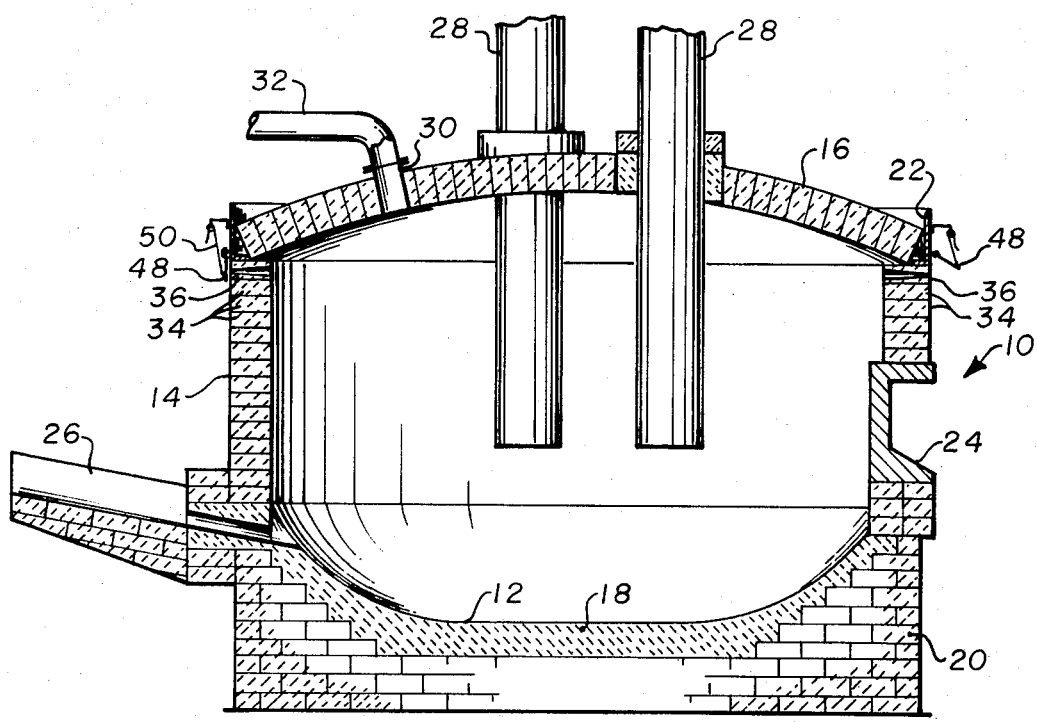
FIG. 1 is a side view in cross section of an electric arc furnace incorporating the present invention.

FIG. 1 illustrates an electric arc furnace 10 including a hearth 12, sidewalls 14 and a roof 16. The hearth 12 is formed from monolithic refractory materials 18 and the brick base 20. The sidewalls 14 and the roof 16 are also formed from refractory materials which are usually in the form of brick but may in certain instances and in certain locations be formed from monolithic material. The roof 16 is arch-shaped and is supported by the roof ring 22. Located in the side walls are the charge door 24 and the spout 26. Extending through the roof are the electrodes 28 and an opening 30 through which the fumes are extracted from the furnace through the duct 32.

Figure 3:
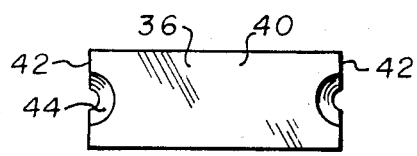
FIG. 3 is a view of the inner face of one of the bricks which form the openings.
Figure 4:
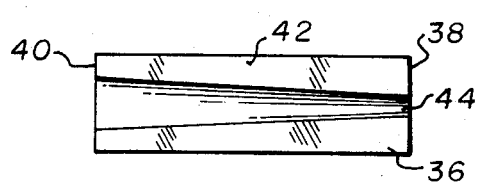
FIG. 4 is a side view of the brick of FIG. 3.

In the illustrated embodiment the sidewalls 14 are formed from bricks 34. The top row of bricks or a row near the top is formed from the specially shaped bricks 36 which form the openings for the introduction of air. The configuration of these bricks and the means by which the openings are opened and closed can be more clearly seen in FIGS. 2, 3, and 4.

The specially formed bricks 36 have an outer face 38, an inner face 40 and side faces 42. Formed in the side faces 42 are grooves 44 which are semicircular in cross section and which are deeper at the inner face 40 and shallower at the outer face 38 thus forming grooves which are tapered down from the inside face to the outside face. When the side faces 42 of the bricks 36 are abutted as shown in FIG. 2, the semicircular grooves form channels 46 from the inside of the furnace to the outside of the furnace with these channels being circular in cross section and having a larger cross section at the inner face than at the outerface.

Figure 2:
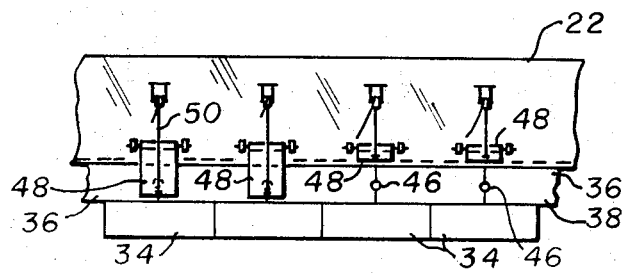
FIG. 2 is an elevation view of a portion of the electric arc furnace of FIG. 1 in the region of the top of the sidewall.

FIG. 2 illustrates means for opening and closing the channels 46. These means merely comprise flaps 48 which are pivotally connected to the roof ring 22 such that they may be pivoted down to cover the channels and pivoted up to open the channels. These flaps 48 are opened and closed by means of the cables 50 or any other suitable means. Of course, other means may be used to cover the channels such as slide doors or plugs or any other suitable arrangements.

The present invention is employed to reduce the temperature differential from the hot face to the cold face of the roof and to maintain uniform stresses in the roof structure thereby greatly improving the roof life and reducing the costs. The furnace operator can monitor the cold face temperature of the roof by strategically placed thermocouplings and then open or close the channels in the sidewall bricks as required to permit a flow of room temperature air to be sucked into the open channels across the hot face of the roof and out the fume vent thus maintaining a relatively uniform and low roof temperature. By reducing the temperature differential from the hot face to the cold face, the hot load strength of the roof material will be at its highest value, the spalling resistance will be maximized and no melting of the refractory will occur because the hot face is kept below the sintering temperature. Also, movement of the lower temperature air over the hot face of the roof will cause condensation of fumes and vapors before they come in contact with the refractory. This will cause the fumes and vapors to be carried out of the furnace as a light dust rather than condensing on the roof. Preventing the condensation of the fumes and vapors on the roof will reduce the stress in the refractory material and thereby reduce the tendency to spall.

The reason for having the tapered channels with the larger end inward of the furnace wall is that any splashes or debris which may collect in the channels can be readily cleared from the opening by pushing the obstruction by a rod into the furnace. Channels which were not tapered or which were tapered in the opposite direction might be impossible to clear. Forming the channels by means of mating grooves in the abutting faces of bricks greatly simplifies the brick forming process. The bricks with the tapered grooves in the side faces can be readily formed by conventional pressing process using conventional refractory brick compositions.

What is claimed is:

1. In an electric arc furnace having a side wall, a roof and a fume vent in said roof, the improvement comprising a series of refractory brick forming a row around said sidewall adjacent the top of said sidewall, each of said refractory bricks including two side faces abutting the adjacent refractory bricks in said row, each of said side faces of said refractory bricks having a groove formed therein, said grooves in abutting faces of adjacent refractory bricks coinciding so as to form channels through said row of refractory bricks extending from outside said furnace to inside said furnace, and means for opening and closing said channels.

2. The invention of claim 1 wherein said grooves are tapered and are deeper at the inner face of said sidewall and shallower at the outer face of said sidewall whereby said channels are tapered down from the inside to the outside of the said sidewall.

3. The invention of claim 2 wherein said grooves are semicircular in cross section and where said channels are circular in cross section.

* * * * *